(12) United States Patent
Tanaka et al.

(10) Patent No.: US 7,733,587 B2
(45) Date of Patent: Jun. 8, 2010

(54) POSITION DETECTING DEVICE CAPABLE OF IMPROVING DETECTION ACCURACY

(75) Inventors: Toyoki Tanaka, Tokyo (JP); Tsukasa Yamada, Tokyo (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 128 days.

(21) Appl. No.: 12/176,578

(22) Filed: Jul. 21, 2008

(65) Prior Publication Data

US 2009/0027785 A1    Jan. 29, 2009

(30) Foreign Application Priority Data

Jul. 26, 2007  (JP) ............................. 2007-194130
May 13, 2008  (JP) ............................. 2008-125445

(51) Int. Cl.
*G02B 7/02* (2006.01)
(52) U.S. Cl. ...................................... 359/824; 359/698
(58) Field of Classification Search ................. 359/824, 359/698
See application file for complete search history.

(56) References Cited

U.S. PATENT DOCUMENTS

| 4,461,544 | A | * | 7/1984 | Isobe et al. ................. 359/698 |
| 4,572,645 | A | * | 2/1986 | Yoshida et al. .............. 396/235 |
| 5,225,941 | A |   | 7/1993 | Saito et al. |
| 5,589,723 | A |   | 12/1996 | Yoshida et al. |
| 5,890,391 | A |   | 4/1999 | Okada |
| 6,072,655 | A |   | 6/2000 | Uwabo et al. |

FOREIGN PATENT DOCUMENTS

| JP | 06-174999 A | 6/1994 |
| JP | 2633066 B2 | 4/1997 |
| JP | 9-191665 A | 7/1997 |
| JP | 09-306122 A | 11/1997 |
| JP | 3218851 B2 | 8/2001 |
| JP | 2003-185406 A | 7/2003 |
| JP | 2005-147955 A | 6/2005 |
| JP | 2006-113874 A | 4/2006 |

* cited by examiner

*Primary Examiner*—Ricky L Mack
*Assistant Examiner*—Vipin M Patel
(74) *Attorney, Agent, or Firm*—Frishauf, Holtz, Goodman & Chick, P.C.

(57) ABSTRACT

A position detecting device includes an optical position detecting element and a position information portion which are disposed so as to be opposed to each other. The position information portion has a binary pattern where a high light efficient portion and a low light efficient portion are alternately repeated when the movable portion moves in a predetermined direction. The position detecting device includes a loose position detecting portion for detecting a loose position of the movable portion by counting a pulse signal obtained by the optical position detecting element, a close position detecting portion for detecting a close position of the movable portion by counting pulse number of driving pulses which are applied to an electromechanical transducer from a position where the loose position detection is carried out, and a combining arrangement for combining the loose position with the close position to calculate a current position of the movable portion.

12 Claims, 10 Drawing Sheets

POSITION DETECTING DEVICE CAPABLE OF IMPROVING DETECTION ACCURACY

This application is based upon and claims the benefit of priority from Japanese Patent Application No. 2007-194130, filed on Jul. 26, 2007 and Japanese Patent Application No. 2008-125445, filed on May 13, 2008, the disclosures of which are incorporated herein in their entirety by reference.

BACKGROUND OF THE INVENTION

This invention relates to a driving device (a linear actuator) and, in particular, to a position detecting device for detecting a position of a movable portion.

Previously, linear actuators (driving devices) using electromechanical transducers such as piezoelectric elements, electrostrictive elements, magnetostrictive elements, or the like are used as auto-focus actuators or zoom actuators for use in cameras. The cameras may be mobile cameras mounted on cellular mobile phones or the like.

By way of illustration, Japanese Patent No. 2633066 (JP-B-2633066) (which will be also called a first patent document), which corresponds to U.S. Pat. No. 5,225,941, discloses a driving device comprising a driving rod frictionally engaged with a lens barrel, a piezoelectric element disposed in contact with the driving rod, and a leaf spring for bringing the driving rod into frictional engagement with the lens barrel. That is, the driving rod is bonded to an end of the piezoelectric element in an expansion direction. The lens barrel is movably supported to the driving rod. The leaf spring produces friction between the driving rod and the lens barrel. In the driving device disclosed in JP-B 2633066, a voltage is applied to the piezoelectric element so as to make a speed of expansion of the piezoelectric element different from a speed of contraction thereof. The driving device disclosed in JP-B-2633066 comprises a lens-barrel position detector. The lens-barrel-position detector comprises a U-shaped slidable contact piece secured to the underside of an arm of the lens barrel and a fixed detecting plate mounted on a fixed member which is disposed below the path of movement of the lens barrel.

However, the lens-barrel-position detector disclosed in the first patent document is disadvantageous in that its slidable portion wears because the U-shaped slidable contact piece in slidably contact with the fixed member.

In addition, Japanese Patent No. 3218851 (JP-B-3218851) (which will be also called a second patent document), which corresponds to U.S. Pat. No. 5,589,723, discloses a driving apparatus comprising a piezoelectric element, a driving member (a driving shaft), coupled to the piezoelectric element, for extending in an expansion direction of the piezoelectric element, and a driven member (a moving member, a lens barrel) having a friction member frictionally coupled to the driving member (the driving shaft). The driving apparatus in JP-B-3218851 drives the lens barrel by devising a driving signal applied to the piezoelectric element.

The second patent document neither discloses nor teaches a position detecting device.

Japanese Unexamined Patent Application Publication No. H09-191665 (JP-A-09-191665) (which will be also called a third patent document), which corresponds to U.S. Pat. No. 5,890,391, discloses a linear drive mechanism using an electromechanical conversion element which is insensitive to elastic deformation of a constituent member. The linear driving mechanism disclosed in JP-A-09-191665 comprises the electromechanical conversion element, a working member which is fixedly connected to the electromechanical conversion element and which displaces with the electromechanical conversion element, a driving member frictionally coupled to the working member, a driven member coupled to the driving member, and a driving pulse generating arrangement for causing expansion/contraction displacement to the electromechanical conversion element. In JP-A-09-191665, an internal barrel is integratedly and fixedly attached to a fixed lens barrel. The internal barrel has extensions which are formed in a radial direction on part of the internal barrel. A drive shaft (a moving portion) arranged parallel to an optical axis is supported by bearings of the extensions so as to be movable in the optical axis direction. A piezoelectric element (the electromechanical conversion element) is disposed between the working member (a vibration friction portion) and the extension of the internal barrel. The top half of the working member touches the drive shaft and a pad is installed on the bottom half of the working member and exerts a force toward the drive shaft via a spring, such that the pad touches the bottom half of the working member. The working member and the pad are friction-bonded to the drive shaft via a suitable friction force. By generating expansion/compression displacements having different rates in the thickness direction of the piezoelectric element, the working member is displaced, and the drive shaft is driven by friction contact with working member together with a lens holding frame serving as the driven member.

The linear drive mechanism disclosed in the third patent document is provided with a position sensor of a ferromagnetic thin-film reluctance element type (hereinafter referred to as "MR sensor") for detecting a moving distance of the lens. The moving distance of the lens is also a moving distance of the lens holding frame (a guide shaft disposed in parallel with the optical axis) A magnetic reluctance element comprising the MR sensor is disposed in the internal barrel, and magnetic rods of north and south magnetic poles are arranged at predetermined intervals on the guide shaft. That is, the MR sensor disclosed in the third patent document detects the moving distance of the lens holding frame in cooperation with the magnetic reluctance element.

Japanese Unexamined Patent Application Publication No. 2006-113874 (JP-A-2006-113874) (which will be also called a fourth patent document) discloses a piezoelectric actuator comprising a position sensor. The piezoelectric actuator disclosed in JP-A-2006-113874 comprises a piezoelectric element (a electromechanical transducer) having one end which is fixed to a fixed portion (a stationary member) by means of adhesive or the like, a rod-shaped drive member (a vibration friction portion) fixed to another end of the piezoelectric element by means of adhesive or the like, and a movable member (a moving portion) which is movably frictionally held on the drive member. The movable member comprises a friction holding portion which engaged on the drive member by a friction force and a lens holder for holding a lens that is coupled to the friction holding portion. The position sensor comprises a magnetic field generating member mounted on the movable member and a magnetic field detecting member fixed on the fixed portion so as to be opposed to the magnetic field generating member. A Hall-effect device, a magneto-resistive (MR) element or the like is suitable for the magnetic field detecting member.

A method of using, as a detection element, the Hall-effect element or the MR element (the MR sensor) in the manner of the third and the fourth patent documents is disadvantageous to miniaturization and cost. This is because it is necessary to mount a magnetic substance bearing magnetism to the moving portion or the fixed portion.

In addition, Japanese Unexamined Patent Application Publication No. 2003-185406 (JP-A-2003-185406) (which will be also called a fifth patent document) discloses a position detecting device of non-contact type which detects a position of a moving member on the basis of capacitance between a fixed electrode and the moving member of the actuator. In the position detecting device disclosed in JP-A-2003-185406, a piezoelectric element (an Electro-mechanical transducer) has an end fixed to a frame (a stationary member) and another end fixed to a drive shaft (a vibration friction portion) with which a moving member (a moving portion) is coupled frictionally. A detecting member is arranged in non-contact with and parallel to the moving member in a moving direction. The detecting member has an electrode with rugged regions formed on a surface opposite to the moving member and is spaced at a distance from the moving member so as to form a capacitor with a capacitance. A drive circuit produces drive pulses which are applied on the piezoelectric element, make electric current flow through the electrode capacitively coupled to the moving member. The amount of the electric current is detected by a detecting circuit and is supplied to a control circuit. When the moving member moves on the electrode, the amount of the electric current is increased ore decreased in response to the shape of the rugged regions of the electrode. It is therefore possible to detect the position of the moving member based on the electric current.

In the manner as described above, the fifth patent document discloses the position detecting device of non-contact type which detects the position of the moving member on the basis of capacitance between the fixed electrode and the moving member. However, the position detecting device disclosed in the fifth patent document is disadvantageous in that power is consumed because it is necessary to always flow the electric current in the electrode. In addition, the position detecting device disclosed in the fifth patent document is also disadvantageous in that there are limitations on selecting material because the moving member must be made of a conductive material.

Furthermore, Japanese Unexamined Patent Application Publication No. 2005-147955 (JP-A-2005-147955) (which will be also called a sixth patent document) discloses a position detecting device which is capable of detecting a current position of a light-shielding plate over a range of the breadth of a slit or larger. The light-shielding plate, which is capable of reciprocating motion in predetermined directions passing through the gap of a photo-interrupter, shields light projected from a light-emitting body toward a light-receiving body. The light-shielding plate changes in width extending in a direction orthogonal to the predetermined directions. The light-shielding plate has a shape which proportionally increases a light-shielding area covering the slit of the photo-interrupter in accordance with the amount of the movement of the light-shielding plate.

However, the sixth patent document merely discloses the position detecting device and the sixth patent document neither discloses nor teaches how to dispose the position detecting device in a case where it is applied to the driving device.

Japanese Unexamined Patent Application Publication No. H06-174999 (JP-A-06-174999) (which will be also called a seventh patent document) discloses a lens initial position detecting device using a photo-interrupter that is capable of accurately detecting the initial position of the lens enable to move in lens barrel. The lens initial position detecting device disclosed in JP-A-06-174999 comprises the photo-interrupter mounted on one of the lens barrel and a lens frame and a light-shielding plate mounted on the other of the lens barrel and the lens frame so that the light-shielding plate passes through between a light-emitting element and a light-receiving element of the photo-interrupter on moving of the lens frame.

However, the seventh patent document merely discloses the lens initial position detecting device which is capable of detecting the initial position of the lens and cannot detect a moving position (an actual position) of the lens.

Japanese Unexamined Patent Application Publication No. H09-306122 (JP-A-09-306122) (which will be also called an eighth patent document), which corresponds to U.S. Pat. No. 6,072,655, discloses a position detecting unit for a magnetic disk drive although it is not a position detecting unit for a driving device using the electro-mechanical transducer. The position detecting unit disclosed in the eighth patent document comprises a scale mounted on a carriage at a side thereof opposed to a main surface of a main frame and a photointerrupter mounted on the main frame. The scale comprises slits bored through the scale at substantially equally spaced intervals along the scale in a direction parallel to a predetermined radial direction. The photointerrupter includes a light-emitting section and a light-receiving section which are opposed to each other with the scale arranged therebetween. Such a method of detecting a position using the position detecting unit comprising an optical position detecting element such as the photointerrupter and a position information portion such as the scale is called an encoder method.

In the position detecting unit of the encoder method disclosed in the eighth patent document, the accuracy of position detection is determined by a resolution of the used optical position detecting element and a workable size of the position information portion. On the other hands, in the driving devices for the mobile cameras, a position adjustment accuracy of several micrometers to some ten micrometers is required. Therefore, in order to carry out position detection using the position detecting unit of the encoder method in the driving device mounted in the mobile camera, it is necessary to work the scale so as to form the slits or the like at intervals of several micrometers. However, such a working is extremely difficult and is not down-to-earth.

SUMMARY OF THE INVENTION

It is therefore an exemplary object of the present invention to provide a position detecting device and a driving device providing therewith, which are capable of miniaturizing the position detecting device at low cost.

It is another exemplary object of the present invention to provide a position detecting device and a driving device providing therewith, which are capable of detecting a position of a movable portion with a high degree of precision.

Other objects of this invention will become clear as the description proceeds.

On describing the gist of an exemplary aspect of this invention, it is possible to be understood that a driving device includes a movable portion, a driving portion for driving the movable portion in a predetermined direction, a cabinet for covering the movable portion and the driving portion, and a position detecting device for detecting a current position of the movable portion. The driving portion includes an electro-mechanical transducer which has a pair of end portions opposite to each other in an expansion/contraction direction and which expands or contracts in the predetermined direction, and a vibration friction portion mounted to one of the end portions of the electro-mechanical transducer. The movable portion includes a moving portion frictionally coupled to the vibration friction portion so as to move in a vibration direction of the vibration friction portion, whereby the driving portion drives the moving portion due to vibrations in the expansion/contraction direction of the electro-mechanical transducer. According to the exemplary aspect of this invention, the position detecting device includes an optical position detecting element and a position information portion which are disposed so as to be opposed to each other. One of the optical position detecting element and the position information portion is mounted on the movable portion while the other of the optical position detecting element and the position information portion is mounted on an internal wall of the cabinet. The position information portion has a binary pattern where a high light efficient portion and a low light efficient portion are alternately repeated when the movable portion moves in the predetermined direction. The position detecting device includes a loose position detecting portion, a close position detecting portion, and a combining arrangement. The loose position detecting portion detects a loose position of the movable portion by counting a pulse signal obtained by the optical position detecting element. The loose position detecting portion produces loose position detected information indicative of the detected loose position. The close position detecting portion detects a close position of the movable portion by counting pulse number of driving pulses which are applied to the electromechanical transducer from a point where the loose position detection is carried out by the loose position detecting portion. The close position detecting portion produces close position detected information indicative of the detected close position. The combining arrangement combines the loose position detected information with the close position detected information to calculate the current position of the movable portion.

DESCRIPTION OF THE PREFERRED EMBODIMENTS

Figure 1:
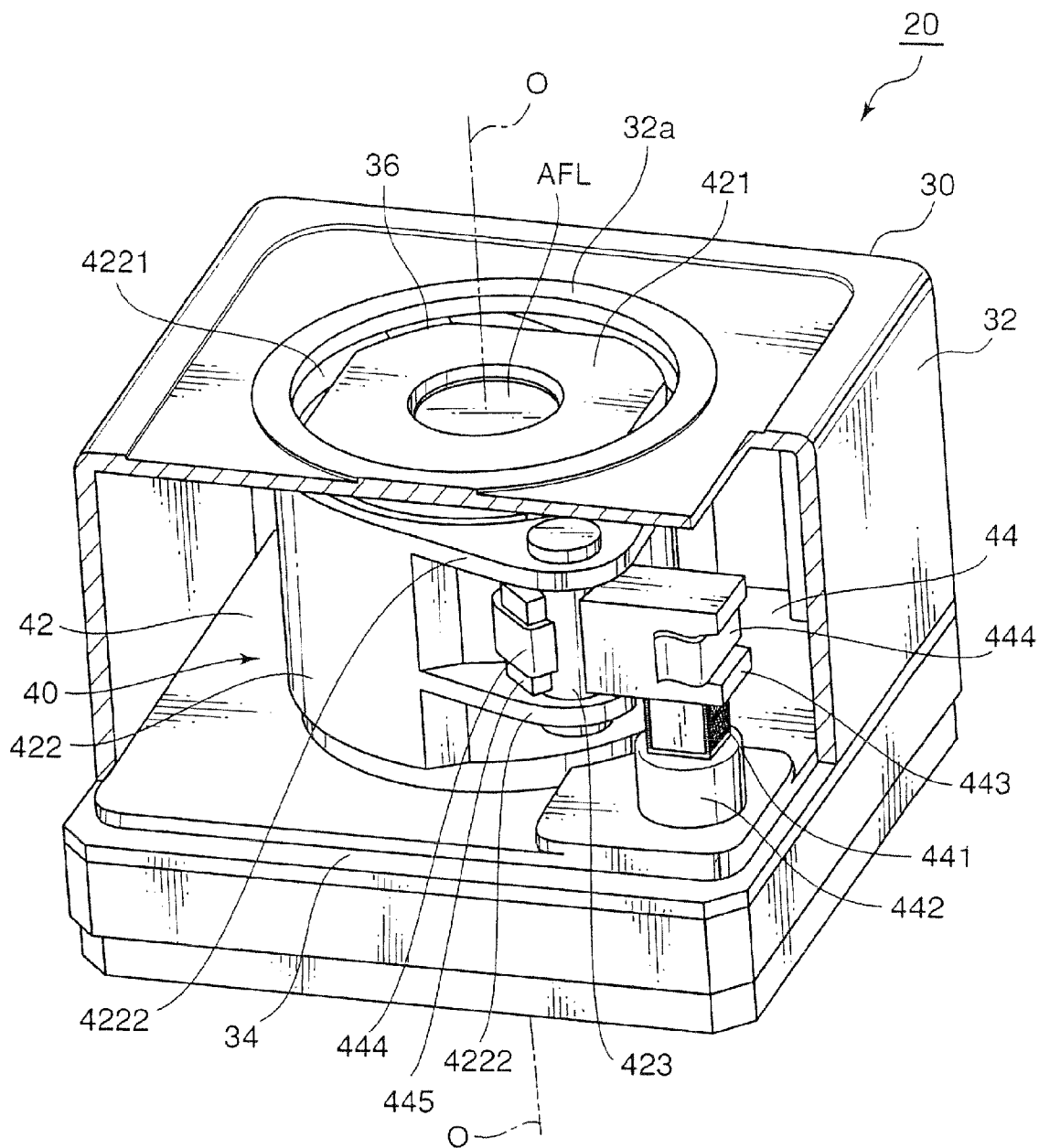
FIG. 1 is a partial cross sectional perspective view of a driving device to which a position detecting device according to a first exemplary embodiment of this invention is applicable.
Figure 1:
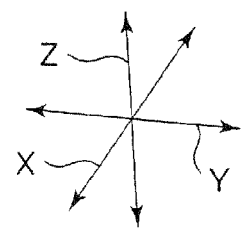
Figure 2:
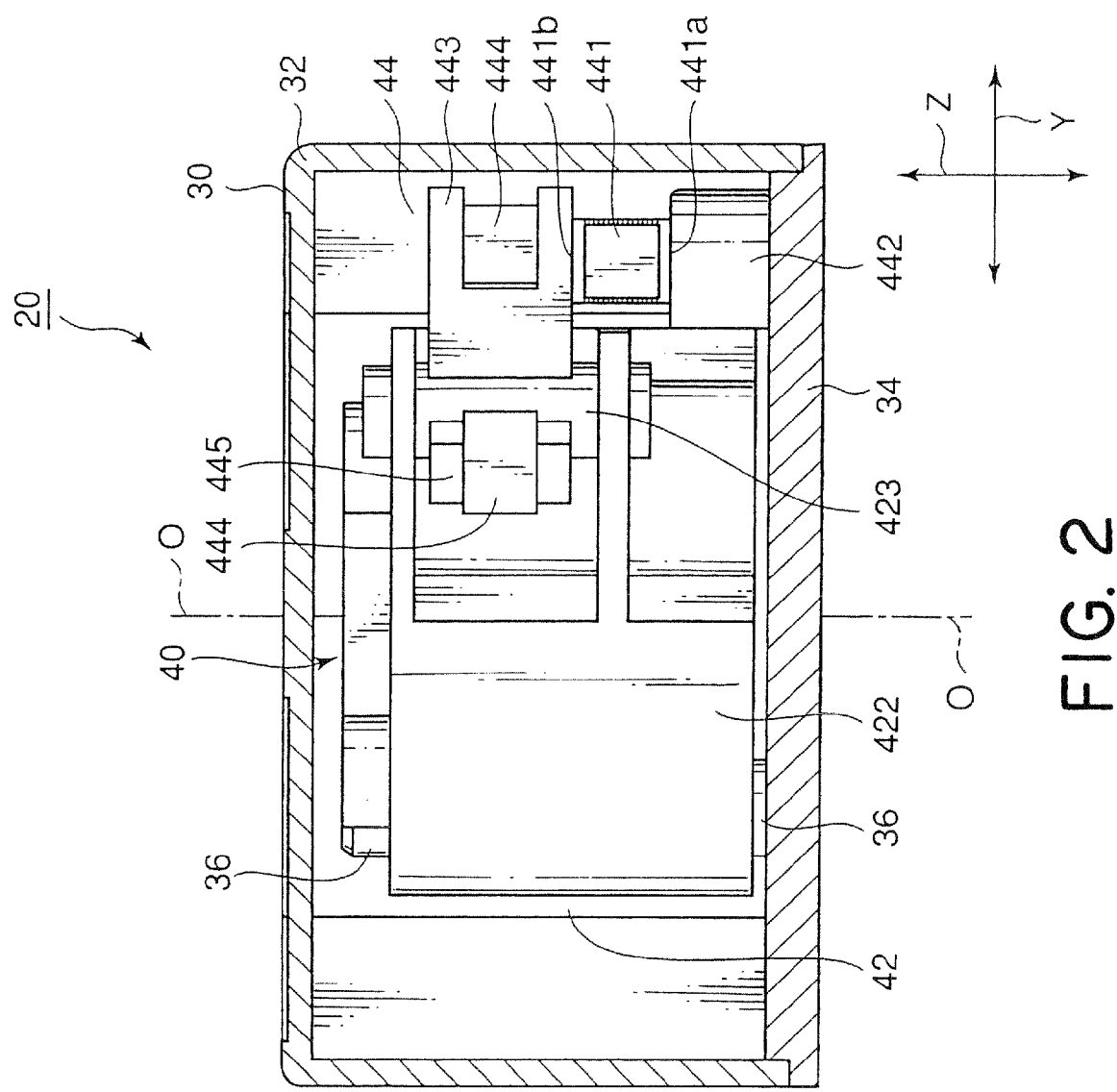
FIG. 2 is a cross sectional view of the driving device illustrated in FIG. 1.
Figure 3:
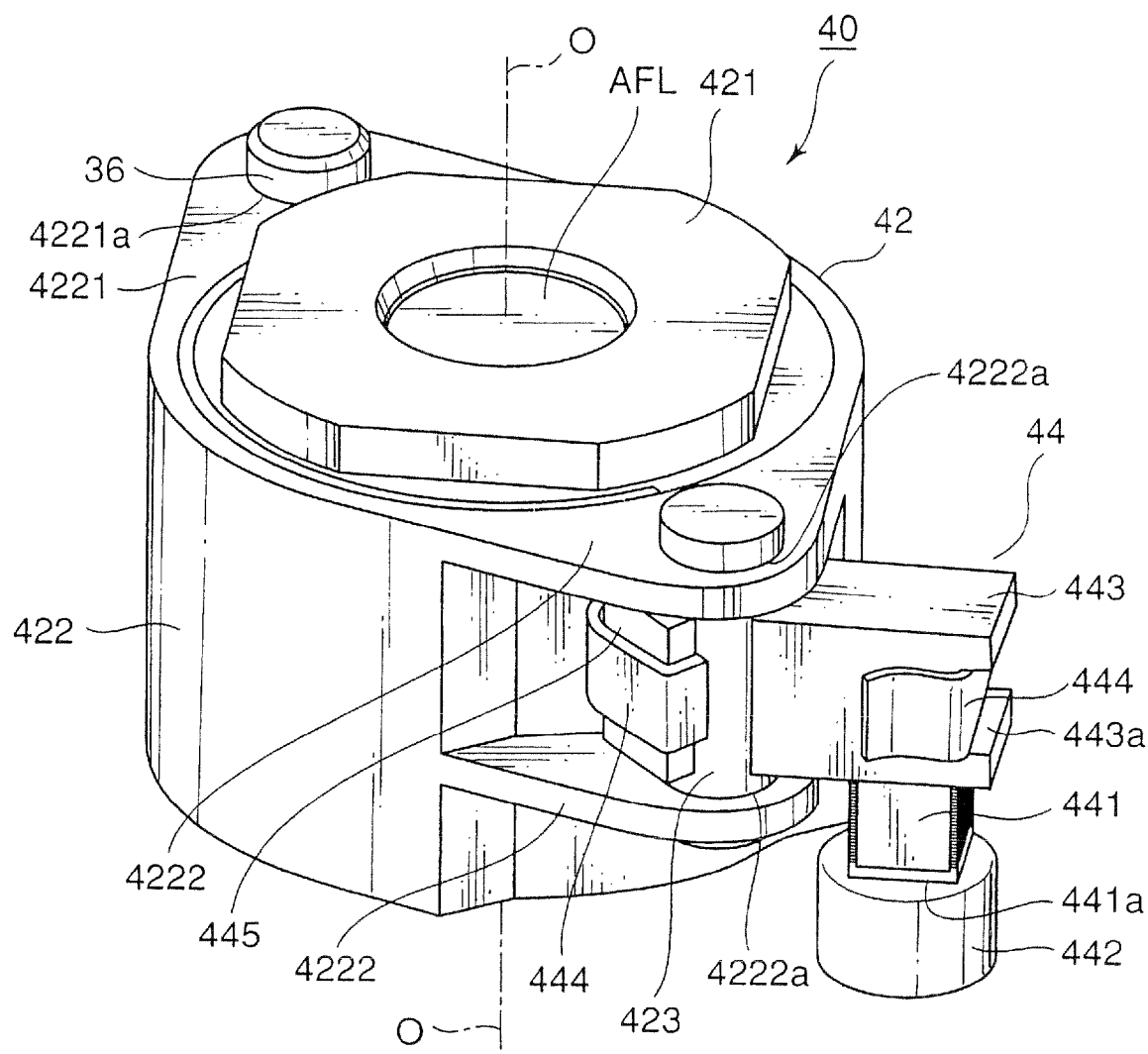
FIG. 3 is a perspective view of an auto-focus lens driving unit which is disposed in the interior of the driving device illustrated in FIG. 1.
Figure 4:
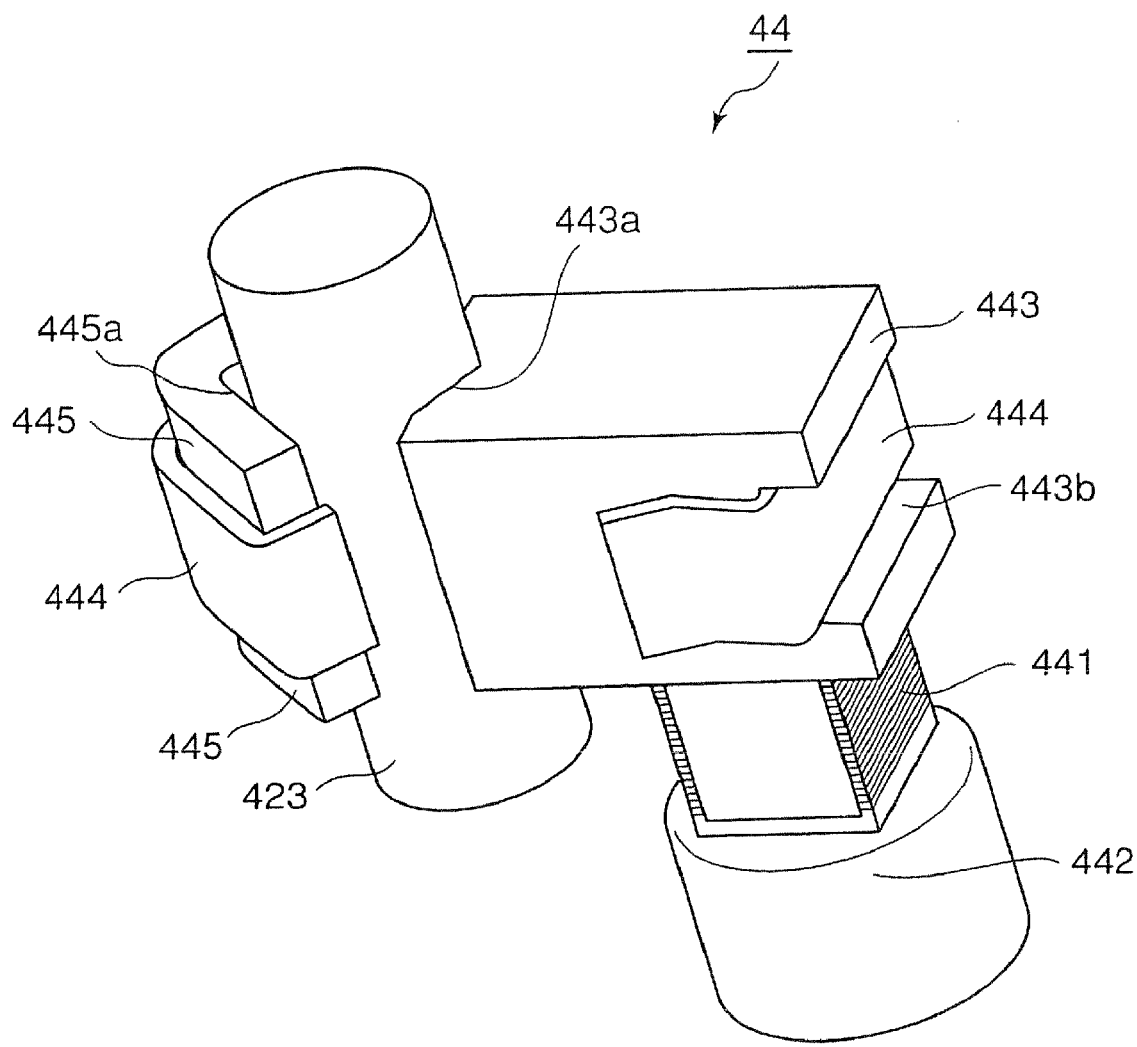
FIG. 4 is a perspective view of a lens driving portion of the auto-focus lens driving unit together with the rod-shaped moving shaft.
Figure 5:
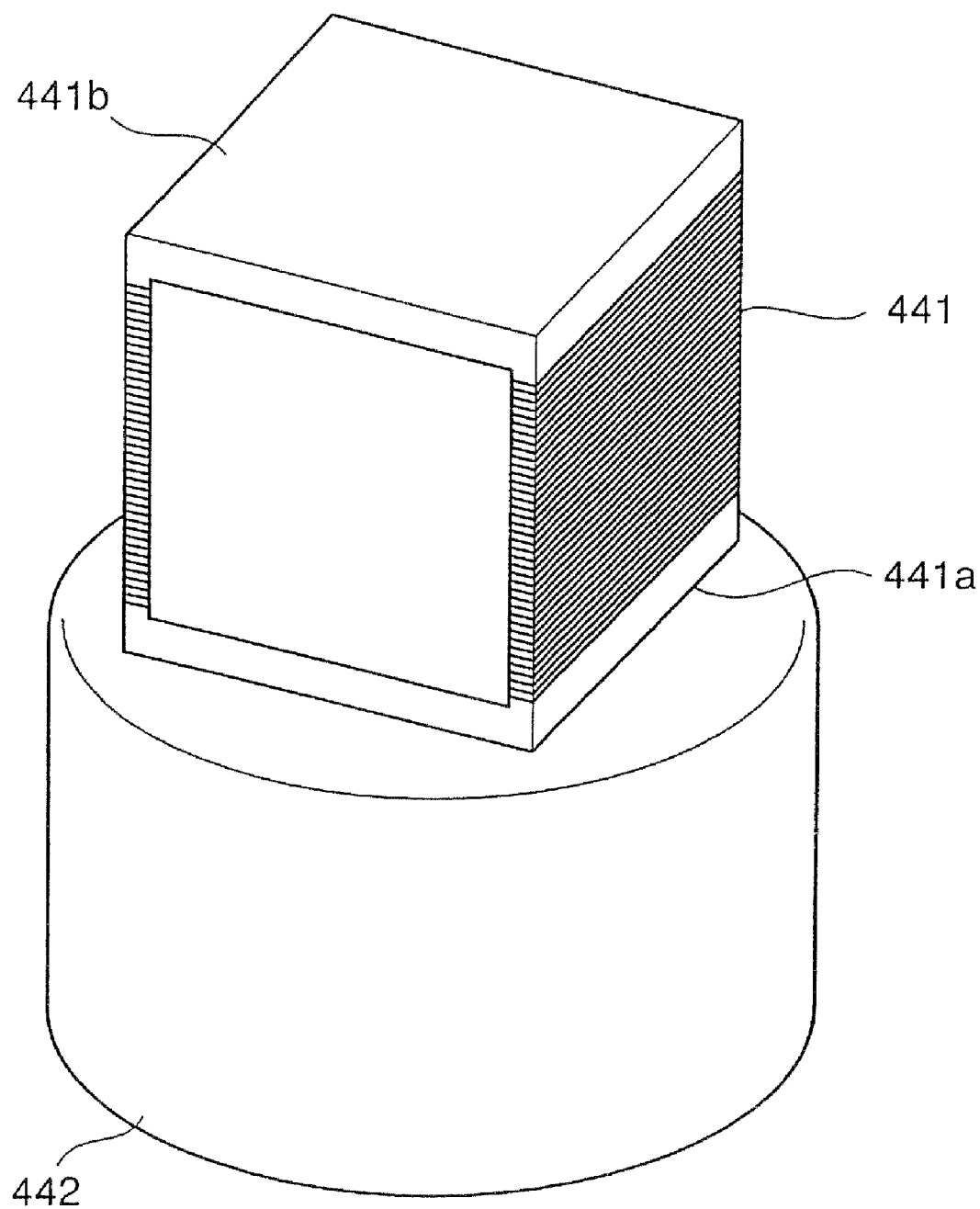
FIG. 5 is a perspective view of a piezoelectric unit for use in the lens driving portion illustrated in FIG. 4.

Referring to FIGS. 1 though 5, the description will proceed to a driving device 20 to which a position detecting device according to a first exemplary embodiment of this invention is applicable. FIG. 1 is a partial cross sectional perspective view of the driving device 20. FIG. 2 is a cross sectional view of the driving device 20 illustrated in FIG. 1. FIG. 3 is a perspective view of an auto-focus lens driving unit 40 which is disposed in the interior of the driving device 20 illustrated in FIG. 1. FIG. 4 is a perspective view of a lens driving portion 44 of the auto-focus lens driving unit 40 together with the rod-shaped moving shaft 423. FIG. 5 is a perspective view of a piezoelectric unit for use in the lens driving portion 44 illustrated in FIG. 4.

Herein, in the manner shown in FIGS. 1 to 4, an orthogonal coordinate system (X, Y, Z) is used. In a state illustrated in FIGS. 1 to 4, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIGS. 1 to 4, the up-and-down direction Z is a direction of an optical axis O of a lens.

As shown in FIG. 1, the driving device 20 is covered with the cabinet (the outer sheath) 30 having a substantially rectangular parallelepiped shape In the cabinet (the outer sheath) 30, the auto-focus lens driving unit 40 (see FIG. 3) which will later be described is disposed. The cabinet (the outer sheath) 30 includes a cap-shaped upper cover 32 and a lower base 34. On the lower base 34 of the cabinet 30, a stationary member (a weight) 442 is mounted through the sheet metal 446 in the manner which will later be described. The upper cover 32 has an upper surface comprising a cylinder portion 32*a* having a center axis which is the optical axis O.

On the other hand, although illustration is not made, the lower base 34 had a central portion in which an image pickup device disposed on a substrate is mounted. The image pickup device picks up a subject image formed by an movable lens (which will later be described) to convert it into an electric signal. The image pickup device may, for example, comprise a CCD (charge coupled device) type image sensor, a CMOS (complementary metal oxide semiconductor) type image sensor, or the like.

In the cabinet (the outer sheath) 30, a guide shaft 36 is disposed at a left and back side. The guide shaft 36 extends in parallel with the optical axis O. The guide shaft 36 stands on the lower base 34 of the cabinet 30. With the optical axis O sandwiched, the rod-shaped moving portion (a movable shaft) 423, which will later be described, is disposed at a right and front side which is opposite side with respect to the guide shaft 36. That is, the guide shaft 36 and the moving shaft 423 are disposed at positions which are rotationally symmetric about the optical axis O.

As shown in FIG. 3, the auto-focus lens driving unit 40 comprises a lens movable portion 42 and the lens driving portion 44. The lens movable portion 42 includes a lens holding frame 421 for holding an auto-focus lens AFL which is the movable lens. The lens holding frame 421 is fixed in the interior of a movable lens barrel 422 having a substantially cylindrical shape. The movable lens barrel 422 comprises a pair of extending portions (however, an upper side thereof is only illustrated in FIG. 3) 4221 which extend in a radial direction outwards at the left and back side. The pair of extending portions 4221 have through holes (not shown) through which the above-mentioned guide shaft 36 passes. In addition, the movable lens barrel 422 comprises a pair of extending portions 4222 which extend in the radial direction outwards at the right and front side. The pair of extending portions 4222 have fitting holes 4222a through which the rod-shaped movable shaft 423 passes and to which the rod-shaped moving shaft 423 is fixed. With this structure, the lens movable portion 42 is movable in the direction of the optical axis O with respect to the cabinet 30.

The lens driving portion 44 slidably supports the lens movable portion 42 in the direction of the optical axis O and drives the lens movable portion 42 in the manner which will later be described.

Referring to FIG. 4 in addition to FIG. 3, the description will proceed to the lens driving portion 44 of the auto-focus lens driving unit 40.

The lens driving portion 44 comprises a laminated piezoelectric element 441 serving as an electromechanical transducer, the static member (the weight) 442, and a vibration friction portion 443. The laminated piezoelectric element 441 has a structure where a plurality of piezoelectric layers are laminated in the optical direction O. As shown in FIG. 2, the laminated piezoelectric element 441 has a first end portion (a lower end portion) 441a and a second end portion (an upper end portion) 441b which are disposed to each other in the expansion/contraction direction. The stationary member (the weight) 442 is coupled to the first end portion (the lower end portion) 441a of the laminated piezoelectric element 441 using an adhesive agent or the like. The vibration friction portion 443 is mounted to the second end portion (the upper end portion) 441b of the laminated piezoelectric element 441 using the adhesive agent or the like. Although the vibration friction portion 443 is directly coupled to the second end portion 441b of the laminated piezoelectric element 441 in the example being illustrated, any member may be sandwiched between the vibration friction portion 443 and the second end portion 441b of the laminated piezoelectric element 441.

In addition, as shown in FIG. 5, a combination of the laminated piezoelectric element 441 and the static member 442 is called the piezoelectric unit.

The rod-shaped moving shaft 423 is frictionally coupled to the vibration friction portion 443. As shown in FIG. 4, the vibration friction portion 443 has a groove 443a which is a V-shape in cross section at a friction coupling portion between the vibration friction portion 443 and the rod-shaped moving shaft 423.

The lens driving portion 44 comprises a spring 444 for pressing (urging) the rod-shaped moving shaft 423 against the vibration friction portion 443. That is the spring 444 serves as an urging arrangement which is fixed to the vibration friction portion 443 and which generates a pressing force for pressing the moving shaft 423. Between the spring 444 and the rod-shaped moving shaft 423, a pad 445 having a V-shaped structure is sandwiched. The pad 445 is disposed so as to be opposed to the vibration friction portion 443 with the moving shaft 423 sandwiched therebetween. In the manner which is similar to the vibration friction portion 443, the pad 445 also has a groove 445a which is a V-shape in cross section at a contact portion between the pad 445 and the rod-shaped moving shaft 423. The vibration friction portion 443 has a groove 443b for holding the spring 444. The spring 444 has a first end portion which is engaged with the vibration friction portion 443 at the groove 443b and a second end portion which extends towards the moving shaft 423. Therefore, the vibration friction portion 443 and the pad 445 are pressed against the rod-shaped moving shaft 423 by the spring 444. As a result, the rod-shaped moving shaft 423 is frictionally coupled to the vibration friction portion 443 with stability.

The lens driving portion 44 and the lens moving portion 42 are disposed in parallel with each other in the optical axis O as shown in FIG. 3. Accordingly, it is possible to lower a height of the auto-focus lens driving unit 40. As a result, it is possible to also lower a height of the driving device 20.

Now, the description will proceed to the laminated piezoelectric element 441. The laminated piezoelectric element 441 has a rectangular parallelepiped shape having an element size of 0.9 mm×0.9 mm×1.5 mm. The piezoelectric material is made of a material having a low Qm such as lead-zirconate-titanate (PZT). The laminated piezoelectric element 441 is manufactured by alternately laminating the piezoelectric materials each having a thickness of 20 microns and the internal electrodes each having a thickness of 2 microns in a corn fashion by fifty layers. In addition, the laminated piezoelectric element 441 has the effective internal electrode size of 0.6 mm×0.6 mm. In other wards, at a peripheral portion positioned the outside of the effective internal electrode of the laminated piezoelectric element 441, there is a ring-shaped dead area (clearance) of a width of 0.15 mm.

Figures 6A, 6B:
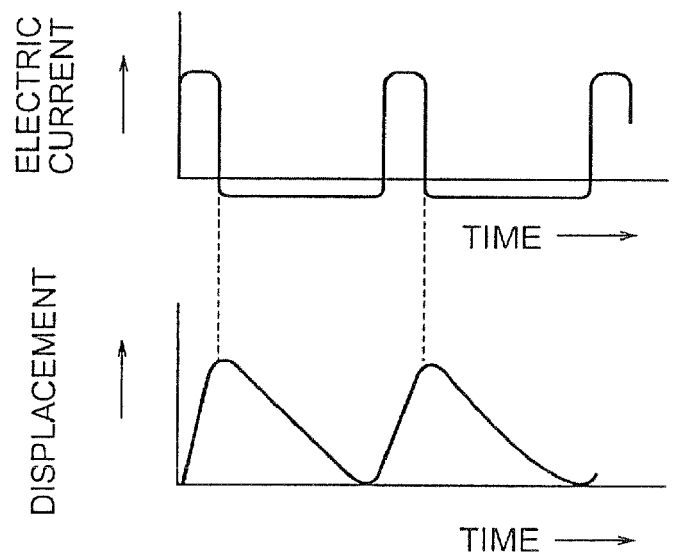
FIG. 6A is a waveform diagram for use in describing a current supplied to a laminated piezoelectric element.
FIG. 6B is a waveform diagram for use in describing displacements generated by the laminated piezoelectric element.

Referring now to FIGS. 6A and 6B, the description will proceed to an electric current supplied to the laminated piezoelectric element 441 and displacements generated in the laminated piezoelectric element 441. FIGS. 6A and 6B are similar to those illustrated in FIG. 5 of the above-mentioned JP-B 3218851 (the second Patent Document) which corresponds to FIGS. 8(a) and 8(b) of U.S. Pat. No. 5,589,723. FIG. 6A shows a change of the electric current supplied to the laminated piezoelectric element 441 by a driving circuit (not shown) and FIG. 6B shows the displacements of the laminated piezoelectric element 441.

As shown in FIG. 6A, a large current (in a positive or forward direction) and a constant current (in a negative or reverse direction) flow alternately through the laminated piezoelectric element 441. Under the circumstances, the laminated piezoelectric element 441 produces alternately a rapid displacement (expansion) corresponding to the large current (positive or forward) and a slow displacement (contraction) corresponding to the constant current (negative or reverse), as shown in FIG. 6B.

That is, by applying a rectangular current to the laminated piezoelectric element 441 (FIG. 6A), it makes the laminated piezoelectric element 441 produce a sawtooth displacements (expansion and contraction) (FIG. 6B).

Referring to FIG. 1 in addition to FIGS. 6A and 6B, the description will be made as regards operation of the auto-focus lens driving unit 40. First, the description will presently be made as regards operation in a case where the lens movable portion 42 moves along the up-and-down direction Z downwards.

It will now be assumed that the large current flows to the laminated piezoelectric element 441 in the positive or forward direction as shown in FIG. 6A. In this event, the laminated piezoelectric element 441 rapidly produces the expansion displacement in the thickness direction as shown in FIG. 6B. As a result, the vibration friction portion 443 rapidly moves along the direction of the optical axis O (the up-and-down direction Z) upwards. In this event, the lens movable portion 42 does not move. This is because, caused by the inertial force, the lens movable portion 42 substantially remains in its position by overcoming the friction force between the vibration friction portion 443 and the rod-shaped moving shaft 423.

Subsequently, it will be assumed that the constant current flows to the laminated piezoelectric element 441 in the negative or reverse direction as shown in FIG. 6A. In this event, the laminated piezoelectric element 441 slowly produces the contraction displacement in the thickness direction as shown in FIG. 6B. As result, the vibration friction portion 443 slowly moves along the direction of the optical axis O (the up-and-down direction Z) downwards. In this event, the lens movable portion 43 substantially moves along the direction of the optical axis O (the up-and-down direction Z) downwards together with the vibration friction portion 443. This is because the vibration friction portion 443 and the rod-shaped moving portion 423 come into surface contact with each other and are coupled to each other due to the friction force generating in the contact surfaces.

In the manner which is described above, by alternately flowing the large current (the positive or forward direction) and the constant current (the negative or reverse direction) through the laminated piezoelectric element 441 to make the laminated piezoelectric element 441 alternately produce the expansion displacement and the contraction displacement, it is possible to continuously move the lens holder 421 (the lens movable portion 42) along the direction of the optical axis O (the up-and-down direction Z) downwards.

It will be assumed that it makes the lens movable portion 42 along the direction of the optical axis O (the up-and-down direction Z) upwards. Conversely, this is obtained by alternately flowing the large current (the negative or reverse direction) and the constant current (the positive or forward direction) through the laminated piezoelectric element 441.

At any rate, by applying the laminated piezoelectric element 441 with a specific waveform, the piezoelectric element 441 expands or contracts and the vibration friction portion 443 vibrates in a displacement direction of the laminated piezoelectric element 441. Inasmuch as the vibration friction portion 443 and the moving portion (the rod-shaped moving shaft) 423 are engaged with each other by friction, a moving direction and a moving speed of the moving portion 423 are controlled (defined) by a shape of the specific waveform applied to the laminated piezoelectric element 441. Accordingly, a moving distance of the moving portion 423 is determined by a total sum of the number of pulses where the applied specific waveform is repeated. The specific waveform applied to the laminated piezoelectric element 441 is, for example, a sawtooth waveform or a rectangular wave having a duty ratio of about 30%. By inverting the specific waveform, it is possible to move the moving portion 423 from an up direction (a forward direction) to a down direction (a reverse direction).

In the manner which is described above, it is possible to detect a position (the moving distance) of the lens movable portion 42 by counting pulse number of the driving pulses applied to the laminated piezoelectric element 441. Herein, this method is called a pulse counting method. The pulse counting method generally has resolution of a range between several nanometers and tens of nanometers. That is, the moving distance of the moving portion 423 driven by one pulse is equal to several nanometers to tens of nanometers. Accordingly, the pulse counting method is advantageous for a case of detecting the position of the lens movable portion 42 under circumstances where the moving distance of the moving portion 423 is short.

However, in a case of detecting the position of the lens movable portion 42 under circumstances where the moving distance of the moving portion 423 is long, the pulse counting method has disadvantages as follows. That is, the longer the moving distance of the moving portion 423 is, easier occurrence of a detection error is due to unevenness in friction force between the vibration friction portion 423 and the moving portion 423. In addition, a reciprocating hysteresis occurs on moving the moving portion 423. In other words, although the driving pulses of the specific waveform having the same pulse number are applied to the laminated piezoelectric element 441, the moving distance of the moving portion 423 differs in the up direction (go) and the down direction (return). Therefore, the pulse counting method must always carry out a count operation by moving the lens movable portion 42 (the moving portion 423) from a fiducial position in one direction. Accordingly, the larger a moving amount of the moving portion 323 based on the fiducial position is, the longer a time interval for taking in position detection of the lens movable portion 42.

In addition, such a pulse counting method is implemented by a counter which is zeroed on the basis of detection of the fiducial position and which counts the pulse number of the driving pulses applied to the laminated piezoelectric element 441.

Hence, this invention detects the position of the lens movable portion 42 by combining the pulse counting method with the above-mentioned encoder method to take advantage of both methods.

Figure 7:
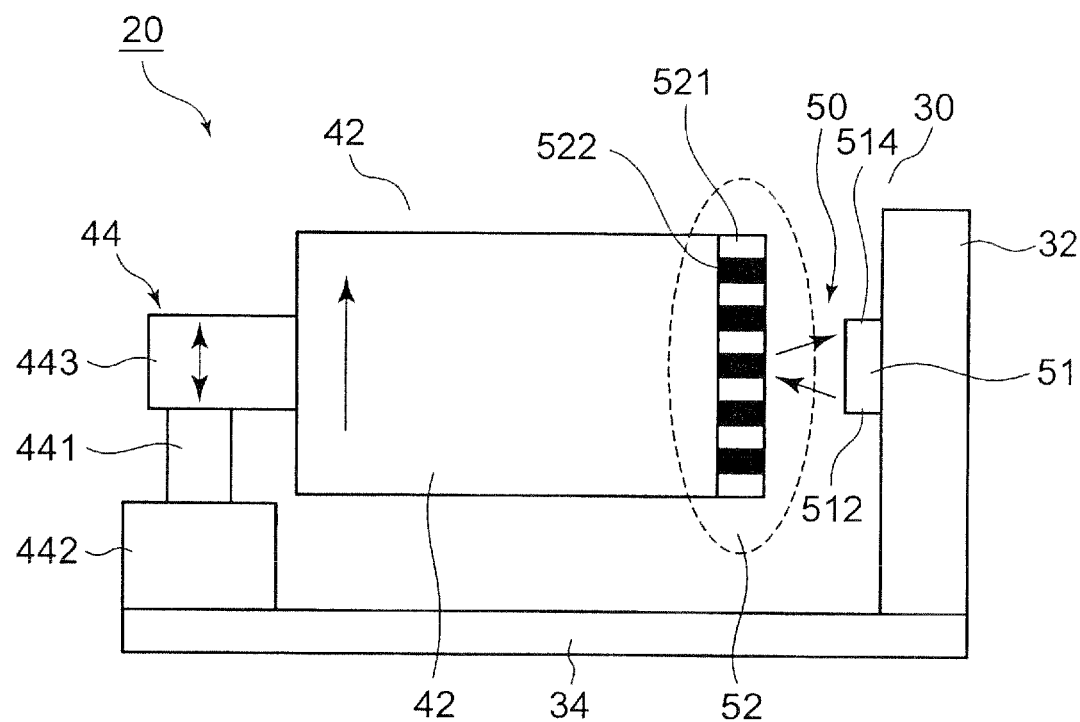
FIG. 7 is a schematic view showing a position detecting portion of the position detecting device according to the first exemplary embodiment of this invention.
Figure 8:
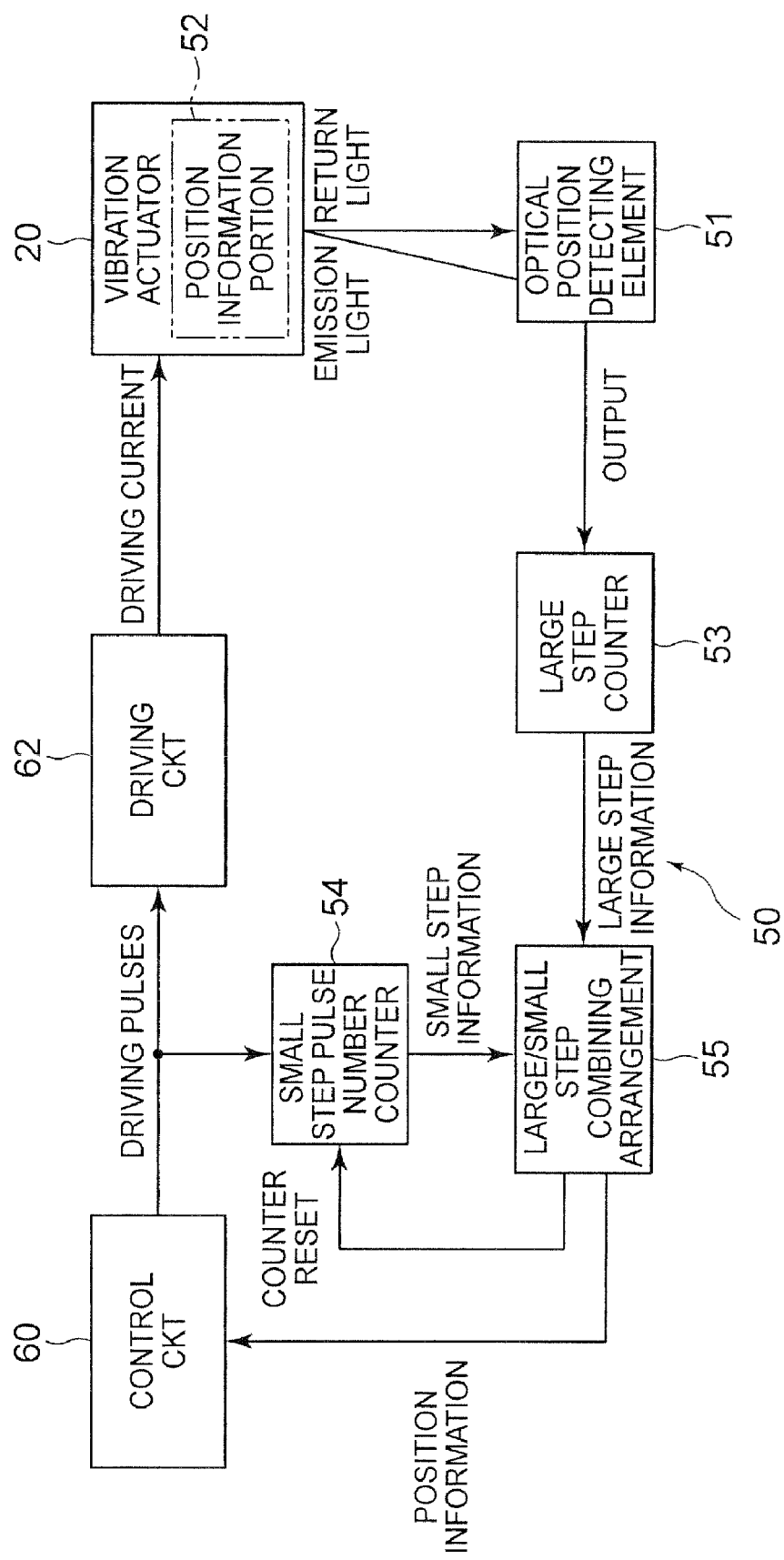
FIG. 8 is a block diagram showing the position detecting device according to the first exemplary embodiment of this invention.

Referring now to FIGS. 7 and 8, the description will proceed to the position detecting device depicted at 50 according to the first exemplary embodiment of this invention. FIG. 6 is a schematic view showing a position detecting portion of the position detecting device 50. FIG. 7 is a block diagram showing the position detecting device 50.

Referring first to FIG. 7, the description will proceed to the position detecting portion of the position detecting device 50. The position detecting portion of the illustrated position detecting device 50 is for detecting a loose position of the lens movable portion 42. The position detecting portion of the position detecting device 50 comprises an optical position detecting element 51 and a position information portion 52. In the example being illustrated, the optical position detecting element 51 is disposed on an inner wall in an outer side wall of the upper cover 32 of the cabinet 30 while the position information portion 52 is mounted on an outer wall of the movable lens barrel 442 of the lens movable portion 44. As shown in FIG. 7, the optical position detecting element 51 and the position information portion 52 are disposed so as to be opposed to each other with a space left therebetween.

Although the position information portion 52 is mounted on the lens movable portion 42 and the optical position detecting element 51 is mounted on the cabinet 30 in the example being illustrated, the position information portion 52 may be mounted on the cabinet 30 and the optical position detecting element 51 may be mounted on the lens movable portion 42.

The illustrated optical position detecting element 51 comprises a reflective photo-interrupter. In the manner which is well known in the art, the reflective photo-interrupter 51 comprises a light-emitting body 512 for emitting light toward the position information portion 52 and a light-receiving body 514 for receiving light which is reflected by the position information portion 52. The light-emitting body 512 comprises, for example, a light emitting diode (LED). The light-receiving body 514 comprises, for example, a photodiode.

Although the optical position detecting element 51 comprises the reflective photo-interrupter in the example being illustrated, the optical position detecting element may comprise a transmission photo-interrupter which will later be described in conjunction with FIG. 9.

In the manner which is described above, the optical position detecting element 51 is disposed so that the optical position detecting element 51 has a light emitting/receiving surface which is in parallel with the up-and-down direction (a predetermined direction) Z. Accordingly, it is possible to miniaturize the driving device 20.

The position information portion 52 has a binary pattern where a high light efficient portion 521 and a low light efficient portion 522 are alternately repeated when the lens movable portion 42 moves in the direction of the optical axis O (the up-and-down direction Z). In the example being illustrated, a difference of light efficiencies between the high light efficient portion 521 and the low light efficient portion 522 is developed from a difference of reflectivity in the binary pattern formed on the position information portion 52.

Referring now to FIG. 8, construction of the position detecting device 50 will be further described.

The light-emitting body 512 of the optical position detecting element 51 emits emission light toward the position information portion 52 mounted on the driving device (the vibration actuator) 20. The light-receiving body 514 of the optical position detecting element 51 receives return light which is reflected by the position information portion 52. The optical position detecting element 51 produces a pulse signal as an output thereof.

The illustrated position detecting device 50 comprises a large step counter 53, a small step pulse number counter 54, and a large/small step combining arrangement 55.

The large step counter 53 counts the pulse signal obtained by the optical position detecting element 51. The large step counter 53 has a counted value indicative of a loose position of the lens movable portion 42. Accordingly, the large step counter 53 serves as a loose position detecting portion for detecting the loose position of the movable portion 42 by counting the pulse signal obtained by the optical position detecting element 51. The large step counter 53 produces loose position detected information indicative of the detected loose position as large step information.

The small step pulse number counter 54 counts pulse number of driving pulses supplied to a driving circuit 62 from a control circuit 60. Responsive to the driving pulses, the driving circuit 62 flows, to the electromechanical transducer (the laminated piezoelectric element) 441 of the vibration actuator 20, the driving current as shown in FIG. 6A. The small step pulse number counter 54 is reset in response to a counter reset signal supplied from the large/small step combining arrangement 55 which will later be described. The small step pulse number counter 54 has a counted value indicative of a close position of the lens movable portion 42. At any rate, the small step pulse number counter 54 serves as a close position detecting portion for detecting the close position of the movable portion 42 by counting the pulse number of the driving pulses which are applied to the electromechanical transducer 441 from a point where the loose position detection is carried out by the loose position detecting portion 53. The small pulse number counter 54 produces close position detected information indicative of the detected close position as small step information.

The large/small step combining arrangement 55 combines the large step information (the loose position detected information) with the small step information (the close position detected information) to calculate the current position of the lens movable portion 42. The large/small step combining arrangement 55 supplies the above-mentioned counter reset signal to the small step pulse number counter 54 at a timing when the large step information (the loose position detected information) supplied from the large step counter 53 changes.

The large/small step combining arrangement 55 sends, to the control circuit 60, position information indicative of the calculated current position of the lens movable portion 42.

The control circuit 60 supplies the driving circuit 62 with the driving pulses on the basis of the position information.

Accordingly, the position detecting device 50 illustrated in FIG. 8 can detect the current position of the lens movable portion 42 with high accuracy although the moving amount of the lens movable portion 42 is long.

At any rate, the position detecting device 50 according to the embodiment detects the current position of the lens movable portion 42 by combining the above-mentioned pulse counting method with the above-mentioned encoder method to take advantage of both methods.

Figure 9:
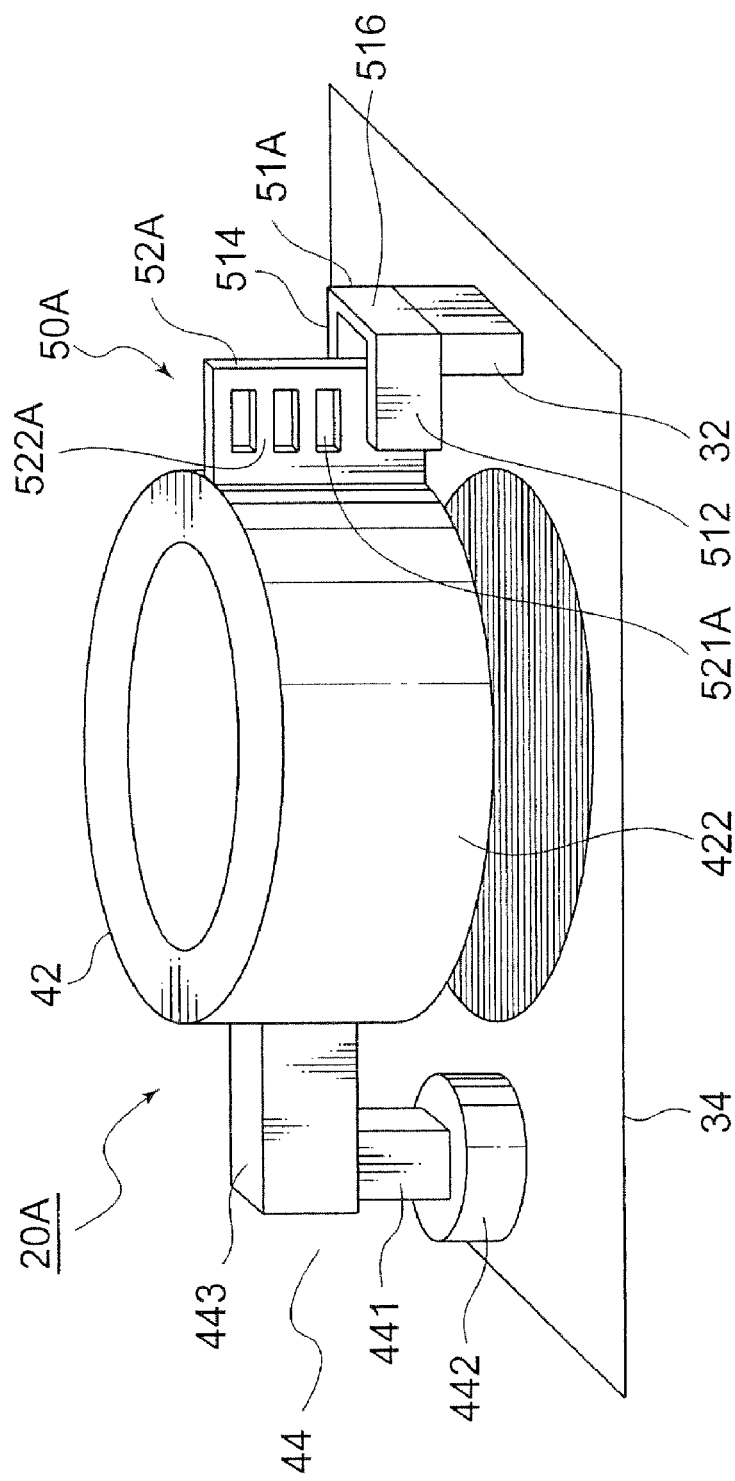
FIG. 9 is a schematic view showing a position detecting portion of a position detecting device according to a second exemplary embodiment of this invention.
Figure 10:
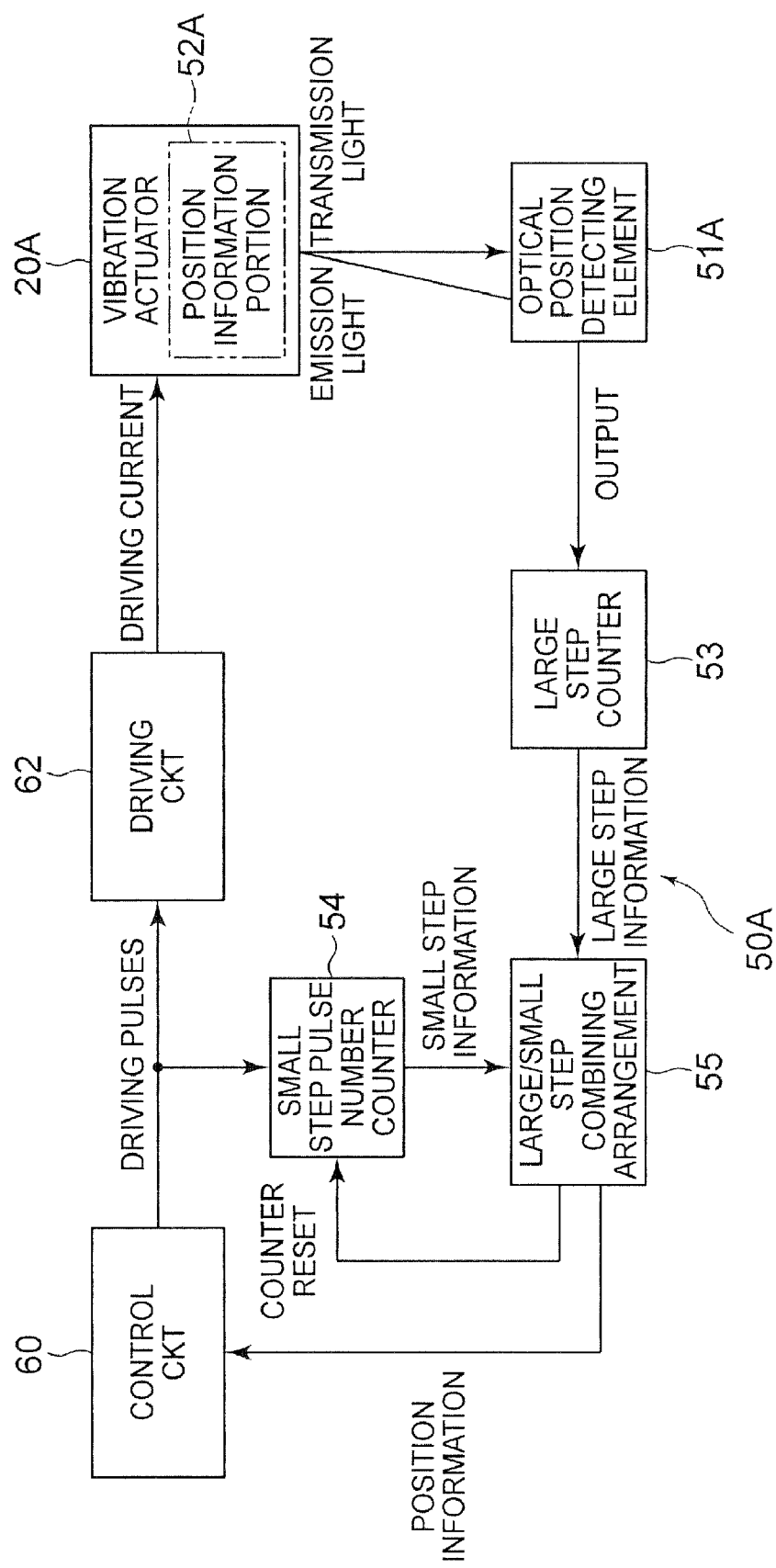
FIG. 10 is a block diagram showing the position detecting device according to the second exemplary embodiment of this invention.

Referring to FIGS. 9 and 10, the description will proceed to a position detecting device 50A for use in a driving device 20A according to a second exemplary embodiment of this invention. FIG. 9 is a schematic view showing a position detecting portion of the position detecting device 50A. FIG. 10 is a block diagram showing the position detecting device 50A.

The position detecting device 50A is similar in structure to the position detecting device 50 illustrated in FIGS. 7 and 8 except that the optical position detecting element and the position information portion are modified from those illustrated in FIGS. 7 and 8 as will later become clear. The optical position detecting element and the position information portion are therefore depicted at 51A and 52A, respectively.

In the example being illustrated, the optical position detecting element 51A is disposed on an internal wall of the upper cover 32 of the cabinet 30 while the position information portion 52A is mounted on an outer wall of the movable lens barrel 442 of the lens movable portion 44. As shown in FIG. 9, the optical position detecting element 51A and the position information portion 52A are disposed so as to be opposed to each other with a space left therebetween.

Although the position information portion 52A is mounted on the lens movable portion 42 and the optical position detecting element 51A is mounted on the cabinet 30 in the example being illustrated, the position information portion 52A may be mounted on the cabinet 30 and the optical position detecting element 51A may be mounted on the lens movable portion 42.

The illustrated optical position detecting element 51A comprises a transmission photo-interrupter. In the manner which is well known in the art, the transmission photo-interrupter 51A comprises the light-emitting body 512 for emitting light toward the position information portion 52A, the light-receiving body 514 for receiving light which passes through the position information portion 52A, and a base portion 516 for connecting the light-emitting body 512 to the light-receiving body 514. In the transmission photo-interrupter 51A, the light-emitting body 512 and the light-receiving body 514 are mounted on the base portion 516 opposite to each other. That is, the transmission photo-interrupter 51A has a U-shape in cross section.

The position information portion 52A mounted on the lens movable portion 42 passes through a gap between the light-emitting body 512 and the light-receiving body 514.

The position information portion 52A has a binary pattern where a high light efficient portion 521A and a low light efficient portion 522A are alternately repeated when the lens movable portion 42 moves in the direction of the optical axis O (the up-and-down direction Z). In the example being illustrated, a difference of light efficiencies between the light efficient portion 521A and the low light efficient portion 522A is developed from a difference of transmittance in the binary pattern formed on the position information portion 52A.

As shown in FIG. 10, the light-emitting body 512 of the optical position detecting element 51A emits emission light toward the position information portion 52A mounted on the driving device (the vibration actuator) 20A. The light-receiving body 514 of the optical position detecting element 51A receives transmission light which transmits or passes through the position information portion 52. The optical position detecting element 51A produces a pulse signal as an output thereof.

In the manner which is similar to the position detecting device 50 illustrated in FIG. 8, the position detecting device 50A illustrated in FIG. 10 can detect the current position of the lens movable portion 42 with high accuracy although the moving amount of the lens movable portion 42 is long.

At any rate, the position detecting device 50A according to the second exemplary embodiment detects the current position of the lens movable portion 42 by combining the above-mentioned pulse counting method with the above-mentioned encoder method to take advantage of both methods.

It will be assumed that the optical position detecting element comprises the reflective photo-interrupter 51 as shown in FIG. 7. In this event, in the binary pattern illustrated in FIG. 7, the high light efficient portion 521 represented by a white portion represents a reflecting portion while the low light efficient portion 522 represented by a black portion represents a non-reflecting portion.

It will be presumed that the optical position detecting element comprises the transmission photo-interrupter 51A as shown in FIG. 9. Under the circumstances, in the binary pattern illustrated in FIG. 9, the high light efficient portion 521A represented by an empty portion represents a transparent portion while the low efficient portion 522A represented by a solid portion represents a non-transparent portion.

In order to make an amount of light detected by the optical position detecting element 51 or 51A change, the following methods may be used as the high light efficient portion 521 or 521A and the low light efficient portion 522 or 522A of the position information portion 52 or 52A:

1) a method of making transmittance change due to a shape such as slits;

2) a method of making reflectivity change due to lines of light and dark;

3) a method of making a distance up to the optical position detecting element 51 or 51A change due to uneven of a shape; and 4) a method of mixing the above-mentioned methods 1) to 3).

In the exemplary aspect of this invention, it is preferable that the optical position detecting element may be disposed so that the optical position detecting element has a light emitting/receiving surface which is in parallel with the predetermined direction. A difference of light efficiencies between the high light efficient portion and the low light efficient portion may be developed, in the binary pattern formed on the position information portion, from one selected from the group consisting of a difference of transmittance, a difference of reflectivity, and a difference of a distance. The optical position detecting element may comprise a photo-interrupter. The photo-interrupter may comprise a reflective photo-interrupter for detecting light which is reflected by the position information portion or may comprise a transmission photo-interrupter for detecting light which passes through the position information portion.

An exemplary advantage according to the invention is that it is possible to provide the position detecting device which is capable of miniaturizing it at low cost and of improving the precision of detection. This is because the position information portion has a binary pattern where a high light efficient portion and a low light efficient portion are alternately repeated when the movable portion moves in the predetermined direction, and the position detecting device comprises a loose position detecting portion for detecting a loose position of the movable portion by counting a pulse signal obtained by the optical position detecting element, a close position detecting portion for detecting a close position of the movable portion by counting pulse number of driving pulses which are applied to an electromechanical transducer from a position where the loose position detection is carried out, and a combining arrangement for combining loose position detected information indicative of the detected loose position with close position detected information indicative of the detected close position to calculate a current position of the movable portion.

While this invention has been particularly shown and described with reference to exemplary embodiments thereof, the invention is not limited to these embodiments. It will be understood by those of ordinary skill in the art that various changes in form and details may be therein without departing from the spirit and scope of the present invention as defined by the claims. For example, the driving device to which the position detecting device according to this invention is applicable is not restricted to those of the above-mentioned exemplary embodiments, it will be easily understood by those of ordinary skilled in the art that the position detection device is applicable to the driving devices as disclosed in the above-mentioned first through fifth patent documents. In addition, this invention is not restricted to the driving devices for cameras, as a matter of course, this invention may be applicable to various driving devices.

What is claimed is:

1. A driving device comprising:

a movable portion;

a driving portion for driving said movable portion in a predetermined direction;

a cabinet for covering said movable portion and said driving portion; and a position detecting device for detecting a current position of said movable portion, wherein said driving portion comprises:

an electro-mechanical transducer having a pair of end portions opposite to each other in an expansion/contraction direction, said electro-mechanical transducer expanding or contracting in the predetermined direction; and a vibration friction portion mounted to one of the end portions of said electro-mechanical transducer, wherein said movable portion comprises a moving portion frictionally coupled to said vibration friction portion so as to move in a vibration direction of said vibration friction portion, whereby said driving portion drives said moving portion due to vibrations in the expansion/contraction direction of said electro-mechanical transducer, wherein said position detecting device includes an optical position detecting element and a position information portion which are disposed so as to be opposed to each other, one of said optical position detecting element and said position information portion being mounted on said movable portion, the other of said optical position detecting element and said position information portion being mounted on an internal wall of said cabinet, wherein said position information portion has a binary pattern where a high light efficient portion and a low light efficient portion are alternately repeated when said movable portion moves in the predetermined direction, wherein said position detecting device comprises:

a loose position detecting portion for detecting a loose position of said movable portion by counting a pulse signal obtained by said optical position detecting element, said loose position detecting portion producing loose position detected information indicative of the detected loose position;

a close position detecting portion for detecting a close position of said movable portion by counting pulse number of driving pulses which are applied to said electro-mechanical transducer from a point where the loose position detection is carried out by said loose position detecting portion, said close position detecting portion producing close position detected information indicative of the detected close position; and a combining arrangement for combining the loose position detected information with said close position detected information to calculate the current position of said movable portion.

2. The driving device as claimed in claim 1, wherein said optical position detecting element is disposed so that said optical position detecting element has a light emitting/receiving surface which is in parallel with the predetermined direction.

3. The driving device as claimed in claim 1, wherein a difference of light efficiencies between said high light efficient portion and said low light efficient portion is developed, in the binary pattern formed on said position information portion, from one selected from the group consisting of a difference of transmittance, a difference of reflectivity, and a difference of a distance.

4. The driving device as claimed in claim 1, wherein said optical position detecting element comprises a photo-interrupter.

5. The driving device as claimed in claim 4, wherein said photo-interrupter comprises a reflective photo-interrupter for detecting light which is reflected by said position information portion.

6. The driving device as claimed in claim 4, wherein said photo-interrupter comprises a transmission photo-interrupter for detecting light which passes through said position information portion.

7. A position detecting device for use in a driving device comprising a movable portion, a driving portion for driving said movable portion in a predetermined direction, and a cabinet for covering said movable portion and said driving portion, said position detecting device detecting a current position of said movable portion, said driving portion comprising an electro-mechanical transducer having a pair of end portions opposite to each other in an expansion/contraction direction, said electromechanical transducer expanding or contracting in the predetermined direction, and a vibration friction portion mounted to one of the end portions of said electro-mechanical transducer, said movable portion comprising a moving portion frictionally coupled to said vibration friction portion so as to move in a vibration direction of said vibration friction portion, said driving portion driving said moving portion due to vibrations in the expansion/contraction direction of said electro-mechanical transducer, wherein said position detecting device includes:

an optical position detecting element and a position information portion which are disposed so as to be opposed to each other, one of said optical position detecting element and said position information portion being mounted on said movable portion, the other of said optical position detecting element and said position information portion being mounted on an internal wall of said cabinet, wherein said position information portion has a binary pattern where a high light efficient portion and a low light efficient portion are alternately repeated when said movable portion moves in the predetermined direction, wherein said position detecting device comprises:

a loose position detecting portion for detecting a loose position of said movable portion by counting a pulse signal obtained by said optical position detecting element, said loose position detecting portion producing loose position detected information indicative of the detected loose position;

a close position detecting portion for detecting a close position of said movable portion by counting pulse number of driving pulses which are applied to said electro-mechanical transducer from a point where the loose position detection is carried out by said loose position detecting portion, said close position detecting portion producing close position detected information indicative of the detected close position; and a combining arrangement for combining the loose position detected information with said close position detected information to calculate the current position of said movable portion.

8. The position detecting device as claimed in claim 7, wherein said optical position detecting element is disposed so that said optical position detecting element has a light emitting/receiving surface which is in parallel with the predetermined direction.

9. The position detecting device as claimed in claim 7, wherein a difference of light efficiencies between said high light efficient portion and said low light efficient portion is developed, in the binary pattern formed on said position information portion, from one selected from the group consisting of a difference of transmittance, a difference of reflectivity, and a difference of a distance.

10. The position detecting device as claimed in claim 7, wherein said optical position detecting element comprises a photo-interrupter.

11. The position detecting device as claimed in claim 10, wherein said photo-interrupter comprises a reflective photo-interrupter for detecting light which is reflected by said position information portion.

12. The position detecting device as claimed in claim 10, wherein said photo-interrupter comprises a transmission photo-interrupter for detecting light which passes through said position information portion.

\* \* \* \* \*